United States Patent
Abebe et al.

(10) Patent No.: US 10,395,078 B1
(45) Date of Patent: Aug. 27, 2019

(54) DIGITAL FINGERPRINT GENERATION USING SENSOR EMBEDDED PACKAGING ELEMENTS

(71) Applicant: International Business Machines Corporation, Armonk, NY (US)

(72) Inventors: Ermyas Abebe, Carlton (AU); Brendan Haesler, Heidelberg (AU); Dileban Karunamoorthy, Carlton (AU); Lenin Mehedy, Doncaster East (AU)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 15/440,750

(22) Filed: Feb. 23, 2017

(51) Int. Cl.
- *G06K 7/10* (2006.01)
- *G06Q 10/08* (2012.01)
- *B65D 25/20* (2006.01)
- *G08C 17/02* (2006.01)

(52) U.S. Cl.
CPC ....... *G06K 7/10475* (2013.01); *B65D 25/205* (2013.01); *G06Q 10/0831* (2013.01); *G06Q 10/0832* (2013.01); *G08C 17/02* (2013.01); *G08C 2201/50* (2013.01)

(58) Field of Classification Search
CPC .................................. G06K 7/10475
USPC ....................................... 356/240.1
See application file for complete search history.

(56) References Cited

U.S. PATENT DOCUMENTS

| 5,443,171 | A | * | 8/1995 | Sprowl | .................. | B29C 57/00 |
| | | | | | | 215/252 |
| 9,037,421 | B2 | | 5/2015 | Jones et al. | | |
| 2002/0177490 | A1 | | 11/2002 | Yong et al. | | |
| 2004/0215480 | A1 | | 10/2004 | Kadaba | | |
| 2005/0099292 | A1 | | 5/2005 | Sajkowsky | | |
| 2008/0247098 | A1 | * | 10/2008 | Deak | ....................... | G11C 11/16 |
| | | | | | | 360/328 |

(Continued)

FOREIGN PATENT DOCUMENTS

| CN | 201447130 U | 5/2010 |
| CN | 204009979 U | 12/2014 |

(Continued)

OTHER PUBLICATIONS thefutureofthings.com, "Hitachi Develops World's Smallest RFID Chip," http://thefutureofthings.com/3221-hitachi-develops-worlds-smallest-rfid-chip/, Nov. 8, 2016, 3 pages.

(Continued)

*Primary Examiner* — Kara E. Geisel
*Assistant Examiner* — Omar H Nixon
(74) *Attorney, Agent, or Firm* — Grant Johnson; Ryan, Mason & Lewis, LLP

(57) ABSTRACT

A method for detecting package tampering, comprising performing scanning of a container comprising a packaged item and a plurality of packaging elements surrounding the packaged item, wherein each of the plurality of packaging elements comprises a sensing component comprising a stress sensor, determining a stress on each of the plurality of packaging elements surrounding the packaged item from the scanning, and generating an output indicating the stress on each of the plurality of packaging elements surrounding the packaged item.

25 Claims, 7 Drawing Sheets

(56) References Cited

U.S. PATENT DOCUMENTS

| | | | | |
|---|---|---|---|---|
| 2011/0251969 A1* | 10/2011 | Gogo | ................... | B65D 55/026 |
| | | | | 705/318 |
| 2013/0098989 A1* | 4/2013 | Salzman | ................ | G06Q 10/08 |
| | | | | 235/375 |
| 2013/0197832 A1 | 8/2013 | Jones et al. | | |
| 2014/0182394 A1* | 7/2014 | Pagani | ................ | G01M 5/0041 |
| | | | | 73/862.045 |
| 2015/0067346 A1 | 3/2015 | Ross et al. | | |
| 2016/0001952 A1 | 1/2016 | Kulkarni et al. | | |
| 2016/0239802 A1* | 8/2016 | Burch, V | ................ | H04W 4/70 |

FOREIGN PATENT DOCUMENTS

| | | |
|---|---|---|
| CN | 204078258 U | 1/2015 |
| EP | 2869240 A2 | 5/2015 |
| WO | 2012131704 A2 | 10/2012 |
| WO | 2014132268 A2 | 9/2014 |

OTHER PUBLICATIONS

Harald Vogt, "Multiple Object Identification with Passive RFID Tags," IEEE International Conference on Systems, Man and Cybernetics, 2002, 6 pages.

www.packaging-gateway.com, "Weird Science: Using DNA Authentication to Fight Counterfeit Packaging," http://www.packaging-gateway.com/features/featureweird-science-dna-authentication-counterfeit-packaging, Jul. 26, 2012, 4 pages.

www.iom3.org, "Biometric Fingerprints for Anti-Counterfeiting," http://www.iom3.org/packaging-professional-magazine/news/2007/jul/01/biometric-fingerprints-anticounterfeiting, Nov. 9, 2016, 2 pages.

S. Vasudevan et al., "On Neighbor Discovery in Wireless Networks with Directional Antennas," ftp://ftp.cs.umass.edu/pub/net/pub/Vasudevan04_NeighborDiscovery.pdf, UMass Computer Science Technical Report 04-53, 2005, 24 pages.

opencv.org, "OpenCV (Open Source Computer Vision)," http://opencv.org/, Nov. 9, 2016, 3 pages.

scikit-image.org, "Image Processing in Python," http://scikit-image.org, Nov. 9, 2016, 2 pages.

Dongfeng Zhang, "A Nano-Tensile Testing System for Studying Nanostructures Inside an Electron Microscope: Design, Characterization and Application," PhD Thesis, https://infoscience.epfl.ch/record/142931/files/EPFL_th4605.pdf, Mar. 2010, 152 pages.

Henrik Mindedal, "A Micro-Miniature Sensor for In Vivo Pressure Measurement," Sensors Magazine, http://www.sensorsmag.com/specialty-markets/medical/a-micro-miniature-sensor-in-vivo-pressure-measurement-1326, Jan. 1, 2007, 2 pages.

Suzanne Smiley, "Active RFID vs. Passive RFID: What's the Difference," http://blog.atlasrfidstore.com/active-rfid-vs-passive-rfid, Mar. 4, 2016, 14 pages.

Z. Shelby et al., "Neighbor Discovery Optimization for Low-Power and Lossy Networks," draft-ietf-6lowpan-nd-12, Aug. 3, 2010, 50 pages.

List of IBM Patents or Patent Applications Treated as Related.

* cited by examiner

300

510

DIGITAL FINGERPRINT GENERATION USING SENSOR EMBEDDED PACKAGING ELEMENTS

BACKGROUND

Typically, customers, when shipping items through one or more intermediaries, such as, for example, shipping services, want assurance of the integrity of the items, and will hold an intermediary accountable if the items are tampered with or lost. A package shipped nationally or internationally may be subject to tampering at various locations throughout its route, including for example, at a manufacturing facility, initial and intermediate shipping facilities, distribution facilities and point of sale locations. Some products of a relatively sensitive nature that are shipped, including, for example, pharmaceuticals, toys, and automotive and aircraft parts can cause harmful health and/or safety risks if tampered with.

Known attempts at preventing loss and/or tampering of packages include labeling or tagging the outside of a package. Such labeling or tagging techniques including, for example, bar codes, holographic labels, radio frequency identification (RFID) tags, etc., have been used with some success. However, these codes, labels, tags, etc., can be lost, stolen or duplicated, since they are located on the outside of a package.

SUMMARY

According to an exemplary embodiment of the present invention, a method for detecting package tampering comprises performing first scanning of a container comprising a packaged item and a plurality of packaging elements surrounding the packaged item, wherein each of the plurality of packaging elements comprises a sensing component comprising a stress sensor. The method further comprises determining a stress on each of the plurality of packaging elements surrounding the packaged item from the first scanning, performing second scanning of the container comprising the packaged item and the plurality of packaging elements surrounding the packaged item, determining a stress on each of the plurality of packaging elements surrounding the packaged item from the second scanning, and comparing the stress on each of the plurality of packaging elements surrounding the packaged item from the first scanning with the stress on each of the plurality of packaging elements surrounding the packaged item from the second scanning.

According to an exemplary embodiment of the present invention, a system for detecting package tampering, comprises a first memory and at least one first processor coupled to the first memory, wherein the at least one first processor is configured to scan at a first site a container comprising a packaged item and a plurality of packaging elements surrounding the packaged item, wherein each of the plurality of packaging elements comprises a sensing component comprising a stress sensor. The at least one first processor is further configured to determine a stress on each of the plurality of packaging elements surrounding the packaged item from the scanning at the first site. The system further comprises a second memory and at least one second processor coupled to the second memory, wherein the at least one second processor is configured to scan at a second site the container comprising the packaged item and the plurality of packaging elements surrounding the packaged item, determine a stress on each of the plurality of packaging elements surrounding the packaged item from the scanning at the second site, and compare the stress on each of the plurality of packaging elements surrounding the packaged item from the scanning at the first site with the stress on each of the plurality of packaging elements surrounding the packaged item from the scanning at the second site.

According to an exemplary embodiment of the present invention, a computer program product for detecting package tampering comprises a computer readable storage medium having program instructions embodied therewith, the program instructions executable by one or more processors to cause the one or more processors to perform a method comprising performing first scanning of a container comprising a packaged item and a plurality of packaging elements surrounding the packaged item, wherein each of the plurality of packaging elements comprises a sensing component comprising a stress sensor, determining a stress on each of the plurality of packaging elements surrounding the packaged item from the first scanning, performing second scanning of the container comprising the packaged item and the plurality of packaging elements surrounding the packaged item, determining a stress on each of the plurality of packaging elements surrounding the packaged item from the second scanning, and comparing the stress on each of the plurality of packaging elements surrounding the packaged item from the first scanning with the stress on each of the plurality of packaging elements surrounding the packaged item from the second scanning.

According to an exemplary embodiment of the present invention, a method for detecting package tampering comprises performing scanning of a container comprising a packaged item and a plurality of packaging elements surrounding the packaged item, wherein each of the plurality of packaging elements comprises a sensing component comprising a stress sensor, determining a stress on each of the plurality of packaging elements surrounding the packaged item from the scanning, and generating an output indicating the stress on each of the plurality of packaging elements surrounding the packaged item.

According to an exemplary embodiment of the present invention, a method for detecting package tampering comprises receiving a signal from each of a plurality of packaging elements surrounding a packaged item in a container, wherein each signal comprises a measured value of stress on a corresponding packaging element of the plurality of packaging elements transmitted from a sensing component of the corresponding packaging element, and generating an output of the measured stress values corresponding to each of the plurality of packaging elements surrounding the packaged item.

These and other exemplary embodiments of the invention will be described or become apparent from the following detailed description of exemplary embodiments, which is to be read in connection with the accompanying drawings.

BRIEF DESCRIPTION OF THE DRAWINGS

Exemplary embodiments of the present invention will be described below in more detail, with reference to the accompanying drawings, of which.

DETAILED DESCRIPTION

Figure 1A:
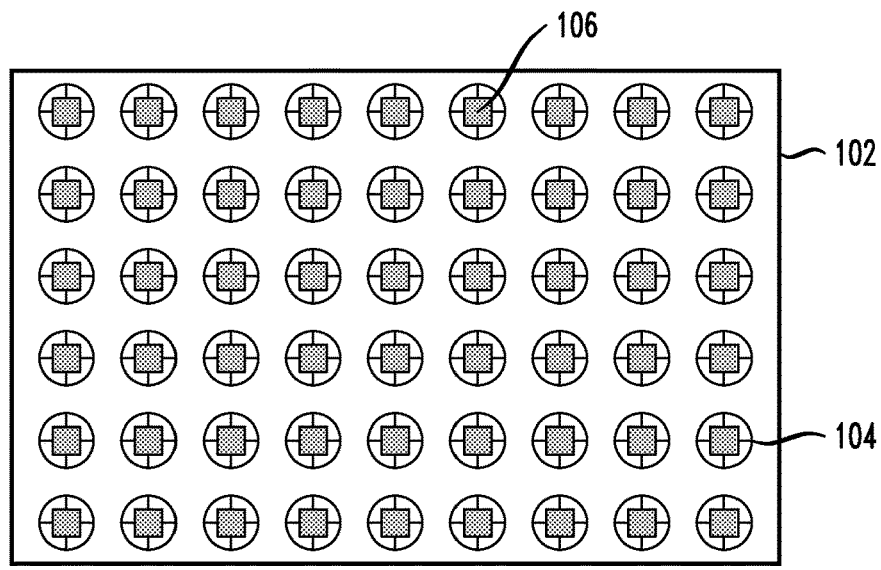
FIG. 1A illustrates an example of smart packaging with a sensing component in each element, according to an exemplary embodiment of the present invention.

Exemplary embodiments of the invention will now be discussed in further detail with regard to detecting package tampering and, in particular, to using smart packaging such as, for example, bubble wrap or other padded packaging and cushioning material, to generate a unique digital fingerprint corresponding to the package. According to an embodiment, elements of the smart packaging each include a sensing component integrated with or attached to the smart packaging element. The sensing component can include, but is not necessarily limited to, a sensor and a radio frequency identification (RFID) device, such as a nano-RFID device or a device using another type of wireless communication protocol in order to wirelessly receive requests for and transmit sensed values and identification information of the sensing component. In accordance with an embodiment of the present invention, the sensing component is formed in the packaging element, such as integrated with or attached to an inner surface of the packaging element. Alternatively, the sensing component may be attached or integrated with an outer surface of the packaging element. This invention may, however, be embodied in many different forms and should not be construed as limited to the embodiments set forth herein.

Embodiments of the present invention provide non-invasive detection technology, wherein detection devices are located within the inside of a package. The detection technology, in accordance with embodiments of the present invention, advantageously is capable of indicating if a package has been tampered with and additionally prevents delays through a supply chain.

A packaging method, according to an embodiment of the present invention, utilizes a unique digital fingerprint, as well as a non-invasive detection technique, in order to ensure integrity of a packaged item while the item is delivered using one or more intermediaries. Such secure packaging can be useful in order to combat against counterfeit goods (e.g., medicines), and tampering with other items that need to be transported, for example, across borders and through multiple intermediaries. Embodiments of the present invention may play an important role in developing a robust and trustworthy supply chain solution employing block chain technologies.

As used herein, "compressive stress" or "compression" refers to a stress on materials that can lead to a smaller volume including, for example, inward pressure.

As used herein "tensile stress" or "tension" refers to a stress state leading to expansion, including, for example, outward pulling, where a dimension (e.g., length) of a material can increase due to the stress.

An embodiment of the invention uses smart packaging such as, for example, bubble wrap, where some or all of the smart packaging elements (e.g., some or all of the bubbles in bubble wrap) each include built-in sensors, such as, for example, compressive and tensile stress sensors. After packaging an item in a container, such as a box, and surrounding the item with the smart packaging, such as, for example, bubble wrap, different elements of the smart packaging, such as, different bubbles of bubble wrap, will have different pressure and tensile values across each element. According to an embodiment, a fingerprint is generated, which comprises the sensor readings (e.g. compression and/or tension values) and identification information (e.g., a digital identifier/tag identifying the sensor) of each of smart packaging elements after the packaging of an item is completed. The sensor readings, referred to herein as a "fingerprint," are used as the unique fingerprint of the packaged item. If the container is opened and the packaged item is repackaged or moved within the container, the sensor readings of the built-in sensing components for the packaging elements will be changed to be different from the unique fingerprint of the packaged item, so that tampering with or replacement of the packaged item can be detected. According to an embodiment, due to a relatively large number of packaging elements, it will be very hard to achieve the same sensor reading (i.e., fingerprint) of the smart packaging elements in the container around the packaged item as it was before tampering with the package. As a result, package tampering would be easily identifiable.

A system, in accordance with an embodiment of the present invention, comprises the smart packaging elements with built-in sensing components, including, for example, compressive and/or tensile stress sensors in the elements of the smart packaging, such as bubbles of bubble wrap. The system also comprises a scanning device operative to wirelessly communicate with the built-in sensing components without opening the container, to retrieve the compressive and/or tensile stress values, and the sensing component identification values based on detected identification signals and stress readings from the smart packaging elements. Additionally, the system comprises a fingerprint generation module to generate a unique fingerprint of the packaged item based on the detected compressive and/or tensile stress values when the packaged item is enclosed in the container, and a fingerprint comparison module to compare the compressive and/or tensile stress values of the packaging elements at an intermediate or final destination to determine whether the compressive and/or tensile stress values are the same or similar to those of the unique fingerprint. According to an embodiment of the present invention, the fingerprint can be based on one or both of compressive and tensile stress values.

Figure 1B:
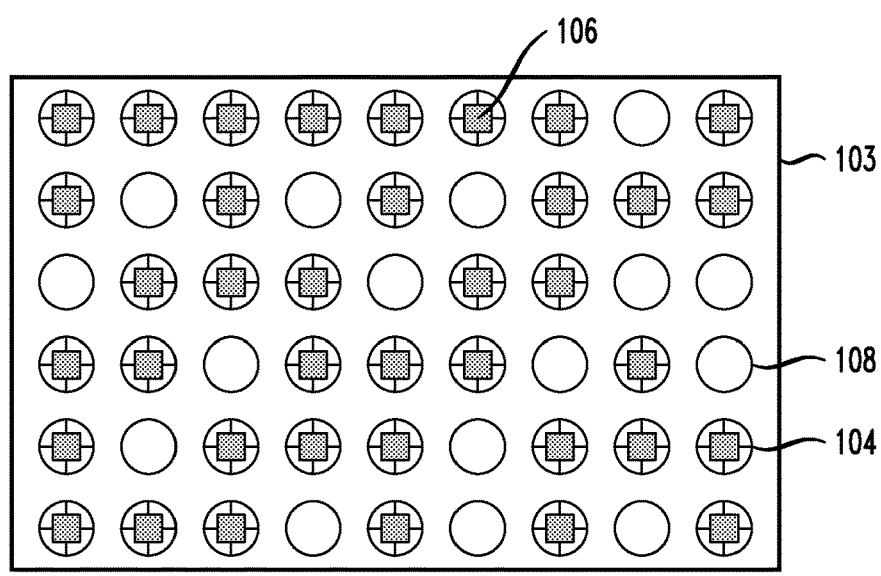
FIG. 1B illustrates an example of smart packaging with sensing components in a subset of elements, according to an exemplary embodiment of the present invention.

The proposed smart packaging may have sensing components inside of each element, for example, each bubble of bubble wrap, or it may have sensing components inside of only a subset of the elements. FIG. 1A illustrates an example of smart packaging 102 (e.g., bubble wrap) in which sensing components 106 are formed inside of each of the elements 104 (e.g., bubbles). FIG. 1B illustrates an example of smart packaging 103 in which sensing components 106 are formed inside of only a subset of elements 104. The remaining elements 108 do not comprise sensing components. Smart packaging 103 illustrated in FIG. 1B may have a cost advantage (i.e., may be cheaper) over smart packaging 102 illustrated in FIG. 1A.

In accordance with an embodiment of the present invention, the sensing components 106 formed in the elements 104 are configured to sense compressive and/or tensile stress in different directions such as, for example, East (E), West (W), North (N), South (S), North-East (NE) and so on. The sensing components 106 are further configured to transmit sensing component identification information, and compressive and/or tensile stress readings to a receiving device, such as a scanning device described in further detail herein. The number of directions in which sensors of the sensing components 106 of the elements 104 are configured to sense compressive and/or tensile stress can be more or less than what is described herein. When an item is wrapped with the smart packaging 102, 103, each element 104 can undergo different levels of compressive and/or tensile stress in different directions. According to an embodiment of the present invention, the compressive and/or tensile stress readings in different directions of one or more sensors in each element 104 are collected and a fingerprint including the compressive and/or tensile stress values in different directions is generated based on those readings. Depending on configuration and design, one or more sensors may be formed in each element 104 to measure compressive and/or tensile stress on the element 104.

Figure 2:
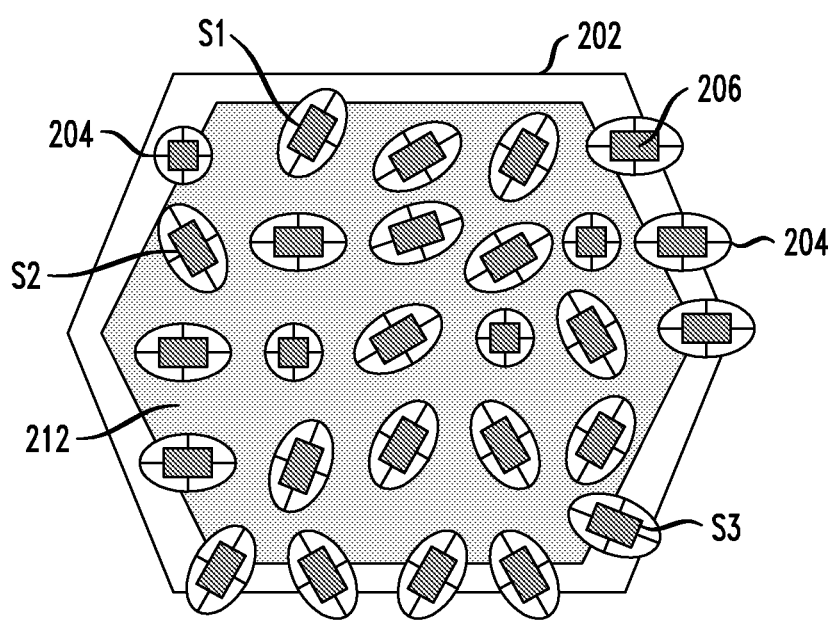
FIG. 2 illustrates an example of a packaged item wrapped in smart packaging, according to an exemplary embodiment of the present invention.

FIG. 2 illustrates an example of an item 212 wrapped in smart packaging 202 (e.g., bubble wrap), according to an embodiment of the present invention. The smart packaging 202 comprises elements 204 (e.g., bubbles) each containing at least one sensing component 206. Some of the elements 204 are shown as deformed from a circular shape due to compressive and/or tensile forces occurring in different directions after packaging the item 212 and surrounding the item 212 with the smart packaging 202. A fingerprint based on the output of the sensing components 206 is generated that includes the compressive and/or tensile stress readings in different directions and sensing component identification information. For example, for purposes of illustration, FIG. 2 points out three sensing components, S1, S2, and S3. An example of a digital fingerprint for these sensing components S1, S2, and S3 may look as follows:

```
S1:    {
       Compression: 123
       Tension: {E: 10, SE: 12.2, S: 2, SW: 12, W: 12, NW: 23, N: 4}
       }
S2:    {
       Compression: 234
       Tension: {E: 23, SE: 2.2, S: 20, SW: 2, W: 22, NW: 78, N: 4}
       }
S3:    {
       Compression: 34
       Tension: {E: 3, SE: 52.2, S: 22, SW: 2, W: 2, NW: 35, N: 4}
       }
...
```

The units for compression and tension can be force units, such as, for example, atmosphere (atm), Pascal (Pa, Newtons per square meter (N/m$^2$)), or pounds per square inch (psi), and identified sensing components respectively correspond to their compression and tension values. The fingerprint can be more or less comprehensive than what is shown. For example, a fingerprint can specify compressive and/or tensile stress values of every smart packaging element in a package, or compressive and/or tensile stress values of a predetermined number of smart packaging elements that is less than all of the smart packaging elements in a package. As noted above in connection with FIGS. 1A and 1B, it may be the case that all or less than all packaging elements include a sensing component.

Figure 3:
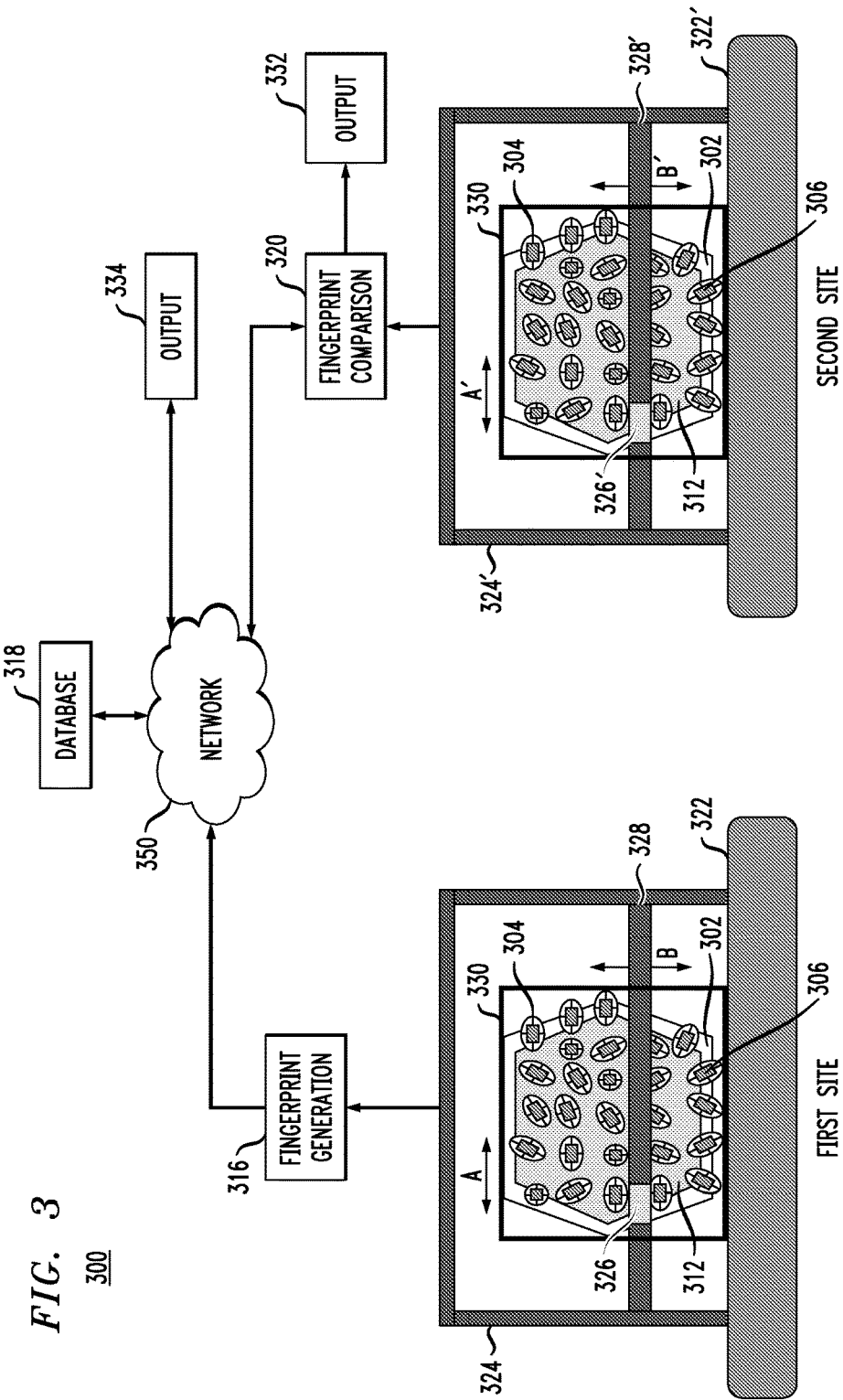
FIG. 3 illustrates a system for detecting package tampering, according to an exemplary embodiment of the present invention.

FIG. 3 illustrates system 300 for detecting package tampering comprising, at a first site, such as, for example, a packaging or origin location, a platform 322 on which a scanning device 324 is mounted. Package or container 330 is placed on platform 322 proximate to the scanning device 324. Package 330, for example, a cardboard box or other container, containing a packaged item 312, is tightly packed with smart packaging 302 such as, for example, bubble wrap, or other padded packaging and cushioning material, positioned around the packaged item 312. Each smart packaging element 304 includes a sensing component, including, for example, a sensor and a nano-RFID device or a device using another type of wireless communication protocol in order to wirelessly receive requests for and transmit sensed values and identification information of the sensing component. In accordance with an embodiment of the present invention, the smart packaging elements 304 are sufficiently small, for example, similar in size to current bubble wrap bubbles, such that the smart packaging elements 304 are small enough to have a relatively large number of the smart packaging elements 304 around a packaged item 312.

An example architecture of the scanning device 324 is shown in FIG. 3. Such a scanning device 324 includes a probe 326 mounted on a shaft 328, such that the probe 326 and/or shaft 328, controlled by a step-motor, can move horizontally and vertically (see arrows A and B) in small increments in order to scan each side of package 330. The size of the movement increments of the probe 326 and/or shaft 328 can depend on a size of the smart packaging elements 304 and their detection range. For example, depending on the detection range of RFID tags or other wireless transceivers of the sensing components 306, the increment of movement can be as small as about 1 cm (e.g. for an RFID frequency about 125 KHz or about 13.56 MHz).

According to an embodiment, the scanning device 324 may have multiple probes and shafts like probe 326 and shaft 328 in order to scan multiple sides of a package simultaneously. The area that can be scanned by a probe may not necessarily depend on the size of the probe, since the probe is detecting electrical identification signals, such as, for example RFID signals, ZigBee®, near field communication (NFC), and Bluetooth® signals. In accordance with an embodiment of the present invention, the scanning device can be a hand held device, such as, but not necessarily limited to, a mobile phone or tablet including an electrical identification signal reader, such as an RFID reader. When using a hand held scanning device, it may be necessary to scan every side of a package to detect electrical identification signals corresponding to smart packaging elements on each side of the package. A fingerprint can include the identifying information of the sensing components in correspondence with the sides of the package on which the sensing components are located and/or the sides of the package from which the electrical identification signals were read.

The scanning device 324 is capable of determining, without opening the package 330, via identification and stress information signals from sensing components 306, the identity of the sensing components corresponding to the respective smart packaging elements 304 and compressive and/or tensile stress values of the packaging elements 304 in the package 330. The same or similar scanning device 324' is located at a second site, such as for example, a destination or intermediate location. The same or similar components, such as the platform 322', the scanning device 324', the probe 326', the shaft 328' and the arrows A' and B', at the second site are referenced by the same numbers as used at the first site, with the addition of a "prime" (') designation.

The system 300 further comprises a fingerprint generation module 316 operatively connected to the scanning device 324 to generate an output comprising a unique fingerprint of the packaged item based on the determined compressive and/or tensile stress values of the packaging elements 304 when the packaged item 312 is enclosed in the package 330. The unique fingerprint may be stored in a database 318 as corresponding to the packaged item 312, and the database 318 can be operatively connected to the fingerprint generation module 316 via, for example, a direct connection, or via a network 350, for example, the Internet, a local area network, a wide area network and/or a wireless network. The database 318 can store a plurality of unique fingerprints respectively corresponding to a plurality of packaged items that are being shipped.

A fingerprint comparison module 320 at the second site (e.g., an intermediate or destination site) is operatively connected to a scanning device 324' and the database 318 via, for example, network 350. Upon the package 330 arriving at the second site, the scanning device 324', like the scanning device 324, determines, without opening the package 330, the identity of each of the smart packaging elements 304 and compressive and/or tensile stress values of the packaging elements 304 in the package 330 based on detected identification signals and signals including compressive and/or tensile stress values of the smart packaging elements 304. The fingerprint comparison module 320 generates an output comprising a fingerprint based on the compressive and/or tensile stress values of the packaging elements 304 at an intermediate or final destination, and compares that fingerprint with the unique fingerprint corresponding to the packaged item 330 retrieved from the database 318, and determines whether the fingerprint is the same or similar to the unique fingerprint. The fingerprint comparison module 320 may determine that there was no tampering with, or removal or replacement of the packaged item 330 if the compressive and/or tensile stress values of the packaging elements 304 at the intermediate or final destination is the same or similar enough to the unique fingerprint. Alternatively, the fingerprint comparison module 320 may determine that there was tampering with, or removal or replacement of the packaged item 330 if the compressive and/or tensile stress values of the packaging elements 304 at the intermediate or final destination is different enough from the unique fingerprint. The database 318 can be, for example, from cloud storage.

The system 300, for example, may allow for a minor shifting of the packaged item 330 and/or of the smart packaging 302 around the packaged item 330, which may result in relatively minor changes to the compressive and/or tensile stress values of one or more packaging elements 304 (e.g., within a predetermined acceptable range, such as, but not necessarily limited to, 0.1 to 1.0 psi, and/or a predetermined acceptable number of packaging elements 304 for which the compressive and/or tensile stress values change, such as, but not necessarily limited to, 1 to 5 packaging elements) to still allow a determination of no tampering, removal or replacement of the packaged item 312. However, upon a substantial change in compressive and/or tensile stress values of one or more packaging elements 304, such as, for example, to different values beyond the predetermined acceptable range of values, and/or exceeding the predetermined acceptable number of packaging elements 304 that may incur a change in stress value(s), the system 300 will make a determination of tampering, removal or replacement. Alternatively, the system 300 may interpret any change from the unique fingerprint as tampering, removal or replacement of the packaged item 312. A determination of tampering, removal or replacement, or of no tampering, removal or replacement of the packaged item 312 can be transmitted from the fingerprint comparison module 320 to output modules 332, 334 via network or non-network connections. The output modules 332, 334 can include, for example, personal computer terminals, and portable devices, such as tablets, mobile phones, laptop computers, which include appropriate interfaces configured to display the determinations. According to an embodiment, the system 300 can include multiple first and second sites depending on the locations from and to which packages may travel during shipping to a location.

According to embodiments of the invention, system 300 is operative to generate fingerprints of the smart packaging elements 304. These fingerprints map the compressive and/or tensile stress values of the smart packaging elements 304 within the package 330. According to an embodiment, the fingerprints also include the identity of the sensing components 306 corresponding to the smart packaging elements 304. In an embodiment of the invention, the sensing components 306 are able to discover other neighbor sensing components using sensor network discovery techniques. For example, sensor network discovery techniques can include Internet Protocol version 6 (IPV6) Neighbor Discovery Protocol (NDP) as used for 6LoWPAN (IPV6 over Low power Wireless Personal Area Networks). IPV6 can be defined for low-power and lossy networks (LLNs), such as IEEE 802.15.4.

Advantageously, the digital fingerprint generation of a package, in accordance with embodiments of the present invention, can be used in connection with detecting package tampering. According to an embodiment, each entity that handles a package, for example, the sender and intermediate authorized personnel, will receive one or more digital keys in order to be granted access to generate a package fingerprint or perform a fingerprint comparison. Such keys can be, for example, private and public-key pairs for an entity. A sender can generate a package fingerprint and sign-off using the sender's private key in order to ensure that the fingerprint was generated by the sender and not an unauthorized party. Such a fingerprint can be stored in a database, for example, in cloud storage, such as block chain or traditional cloud storage, such that the fingerprint is retrievable later.

According to an embodiment, the fingerprint can be hashed so that the actual fingerprint data, including the compressive and/or tensile stress values of the smart packaging elements, is not decodable. Such an un-decodable format of a fingerprint would ensure that even with very sophisticated instruments, for example, robots, the compressive and/or tensile stress values of the smart packaging elements cannot be easily obtained by potential hackers. If the fingerprint is stored in an un-decodable format, compromising the fingerprint would require testing a large number of combinations of the smart packaging elements, which would likely not be cost effective for potential hackers.

As noted above, a system may require an absolute match to a fingerprint to prevent a tampering determination, where not a single smart packaging element can have altered compressive and/or tensile stress values or go undetected because of machine error or due to disturbances during transportation, such as, for example, shaking. Alternatively, as noted above, a system can specify a threshold, for example >95% match of the fingerprint, in order to allow for a certain amount of machine error during the detection of the fingerprint at the receiver side and/or disturbances which may alter the compressive and/or tensile stress values of the smart packaging elements during transportation. According to an embodiment, depending on whether all sides of a package are scanned, which can vary, especially in the case of a hand-held scanning device, electrical identification signals, such as, for example, RFIDs, may only be detected on select sides of a package. In this case, a relatively lower threshold for a fingerprint match, for example, >60% match, may suffice to conclude that no tampering occurred. Such functionality may be useful if, for example, a user decides to scan less than a total package on receipt, so that a match with an original fingerprint based on a full scan at shipping, may be relatively lower.

According to an embodiment, a receiver scans a package and gathers the package fingerprint data in the same way as the sender. The receiver can extract the sender's fingerprint using the sender's public-key. The sender's fingerprint is then compared with the detected fingerprint at the receiver side. The comparison can be performed using different techniques depending on how the sender's fingerprint was sent. For example, according to an embodiment, if the fingerprint is hashed, devices on the receiver end will then need to also hash the detected fingerprint in order to compare it to the sender's fingerprint. An entity may also choose not to hash, but rather store the fingerprint in a decodable format.

As discussed above, in the case of an exact match, it is assumed that the scanning of the package can be done without altering compressive and/or tensile stress values of the smart packaging elements, and that none of the compressive and/or tensile stress values of the smart packaging elements were altered during transport.

Alternatively, if a matching threshold has been provided, the receiver would check whether there is a match of the compared package fingerprints that is above the given threshold. For example, given a threshold of 95%, there must be a minimum of a 95% match of the package fingerprints at the sender and receiver sides.

According to an embodiment, if a package is opened and repackaged by authorized personnel, for example a customs agent at an intermediate point, the package fingerprint will be re-generated for the repackaged item and signed-off by the authorized personnel's private key. To detect tampering, the receiver will then compare the fingerprint at the receiver site with this new fingerprint corresponding to the repackaged item rather than the original fingerprint signed-off by the sender. Thus, throughout a supply chain, a receiver can compare the detected fingerprint at the receiver site with the most recent fingerprint generated by the sender or intermediate authorized personnel before confirming safe delivery. If any actionable discrepancy in the fingerprint is detected, a notification (e.g., tampering notification) is automatically generated, and necessary actions are taken, such as applying penalties and/or notifying the sender and/or receiver.

As noted above, a mix of traditional packaging elements and the smart packaging elements of the embodiments may be used. Use of a mixture of traditional packaging elements and the smart packaging elements may reduce cost and potentially achieve similar results to prevent tampering as described above. Other sensors that may be used in the packaging elements may comprise, but are not necessarily limited to, temperature sensors and humidity sensors.

Figure 4:
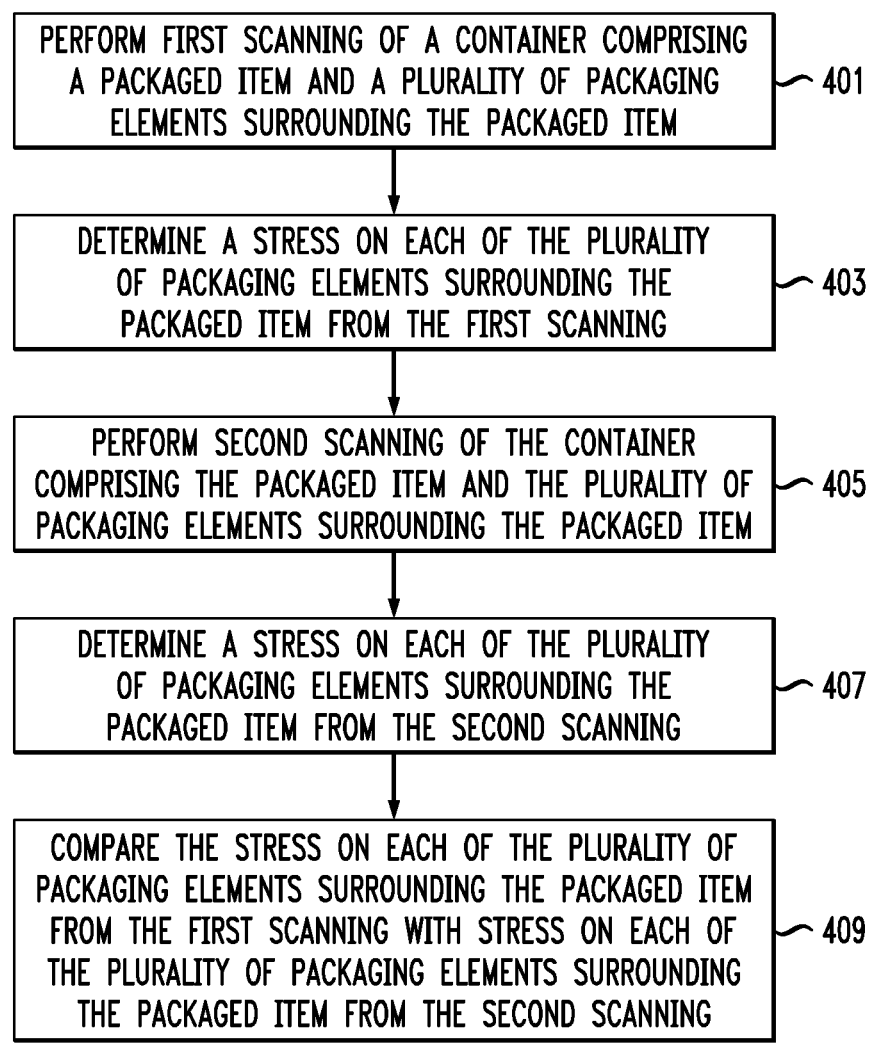
FIG. 4 is a flow diagram of a process for detecting package tampering, according to an exemplary embodiment of the invention.

FIG. 4 is a flow diagram of a process for detecting package tampering, according to an exemplary embodiment of the invention. Referring to FIG. 4, the process 400 includes, at block 401, performing first scanning of a container comprising a packaged item and a plurality of packaging elements surrounding the packaged item. Each of the plurality of packaging elements comprises a sensing component comprising a stress sensor. According to an embodiment, the stress sensor can include a compressive stress sensor and/or a tensile stress sensor.

The process 400 further includes, at block 403, determining a stress on each of the plurality of packaging elements surrounding the packaged item from the first scanning. Referring to blocks 405 and 407, a second scanning of the container comprising the packaged item and the plurality of packaging elements is performed, and a stress on each of the plurality of packaging elements surrounding the packaged item from the second scanning is determined. The process 400 further includes, at block 409, comparing the stress on each of the plurality of packaging elements surrounding the packaged item from the first scanning with the stress on each of the plurality of packaging elements surrounding the packaged item from the second scanning.

The first scanning and the second scanning are non-invasive, being performed when the container is closed and/or sealed, and can be performed at respective first and second sites, such as, for example, a packaging or sending site, and an intermediate or receiver site.

The stress on each of the plurality of packaging elements surrounding the packaged item from the first scanning and from the second scanning comprises a compressive stress and/or a tensile stress, which can each be measured in more than one direction.

Each sensing component can be configured to wirelessly transmit a measured value of the stress on each of the plurality of packaging elements surrounding the packaged item from the first scanning and from the second scanning and to wirelessly transmit identification information to identify itself. According to an embodiments, identification of a sensor can be in various forms of a unique identifier that is unique, for example, globally or per a manufacturer. Such an identifier can be generated using, for example, a standardized scheme, for example Electronic Product Code (EPC), as done with RFID tags.

The process may further include generating first and second outputs indicating stresses on the plurality of packaging elements surrounding the packaged item from the first and second scanning, respectively. The first output can be compared with the second output, and a conclusion can be formed whether package tampering occurred based on a result of the comparing. For example, it may be determined that there is a difference between the stress on each of the plurality of packaging elements surrounding the packaged item from the first scanning and the stress on each of the plurality of packaging elements surrounding the packaged item from the second scanning. According to an embodiment, the determined difference is compared to a threshold value to determine whether package tampering occurred. Alternatively, any detected difference may lead to a conclusion of package tampering.

Embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
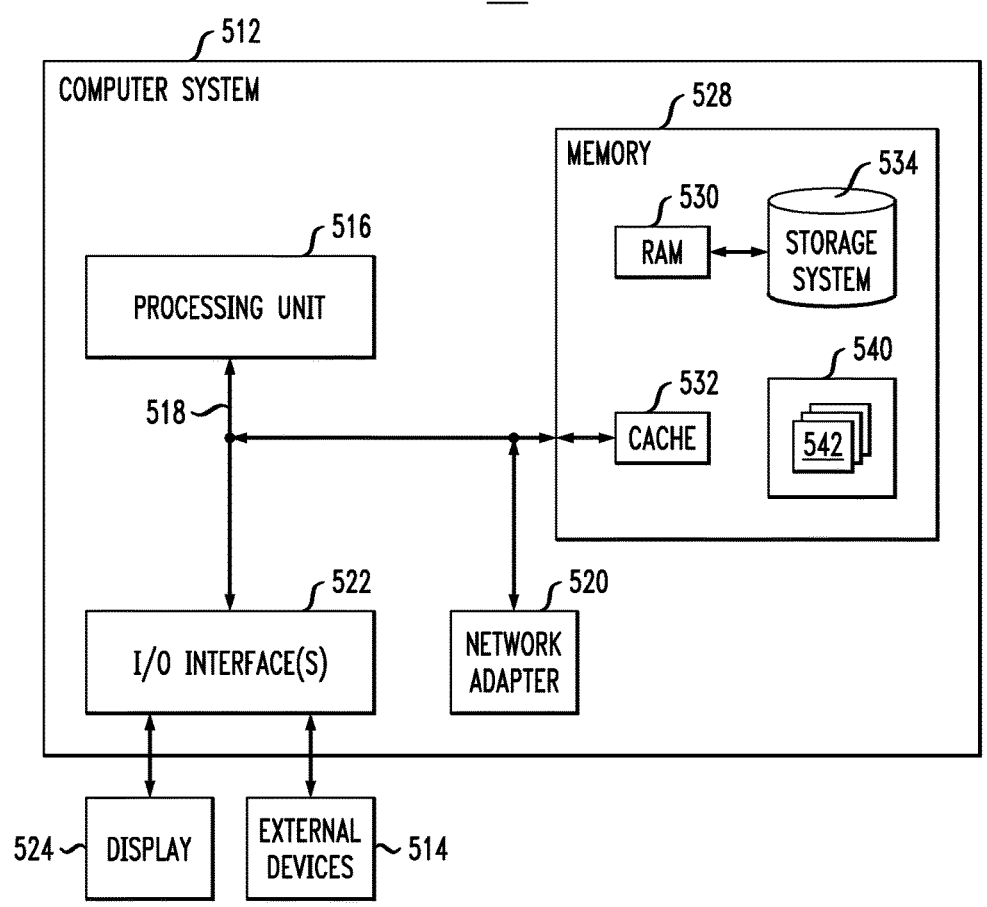
FIG. 5 illustrates a computer system in accordance with which one or more components/steps of the techniques of the invention may be implemented, according to an exemplary embodiment of the invention.

One or more embodiments can make use of software running on a general-purpose computer or workstation. With reference to FIG. 5, in a computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

The bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 512 typically includes a variety of computer system readable media. Such media may be any available media that is accessible by computer system/server 512, and it includes both volatile and non-volatile media, removable and non-removable media.

The system memory 528 can include computer system readable media in the form of volatile memory, such as random access memory (RAM) 530 and/or cache memory 532. The computer system/server 512 may further include other removable/non-removable, volatile/nonvolatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 518 by one or more data media interfaces. As depicted and described herein, the memory 528 may include at least one program product having a set (e.g., at least one) of program modules that are configured to carry out the functions of embodiments of the invention. A program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc., one or more devices that enable a user to interact with computer system/server 512, and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

It is understood in advance that although this disclosure includes a detailed description on cloud computing below, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Computing node 510 in FIG. 5 can be an example of a cloud computing node. Computing node 510 is only one example of a suitable cloud computing node and is not intended to suggest any limitation as to the scope of use or functionality of embodiments of the invention described herein. Regardless, computing node 510 is capable of being implemented and/or performing any of the functionality set forth hereinabove. It is also to be understood that computing node 510 is not necessarily a cloud computing node.

Figure 6:
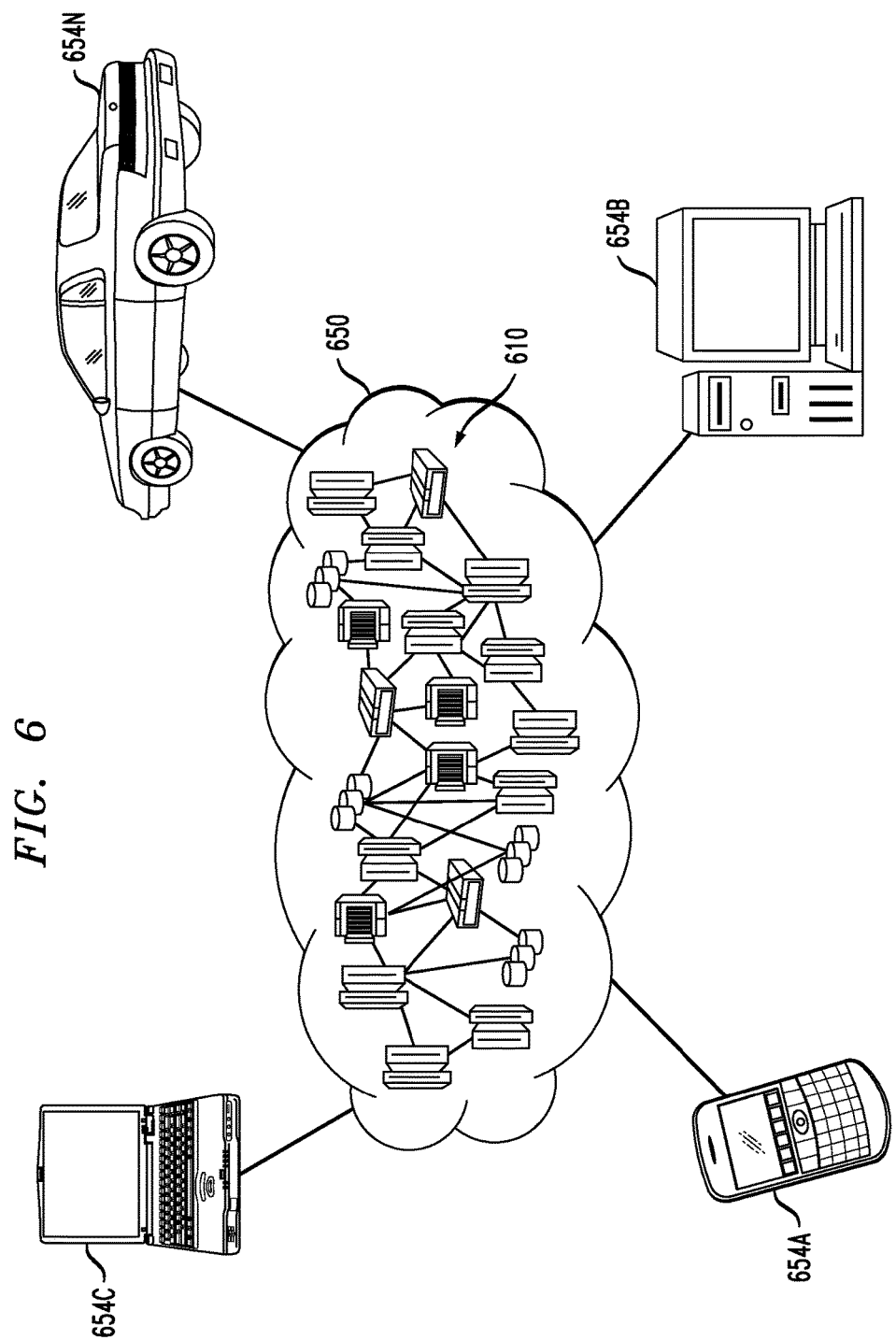
FIG. 6 depicts a cloud computing environment, according to an exemplary embodiment of the present invention.

Referring now to FIG. 6, illustrative cloud computing environment 650 is depicted. As shown, cloud computing environment 650 comprises one or more cloud computing nodes 610 with which local computing devices used by cloud consumers, such as, for example, a wearable device (not explicitly shown), a personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
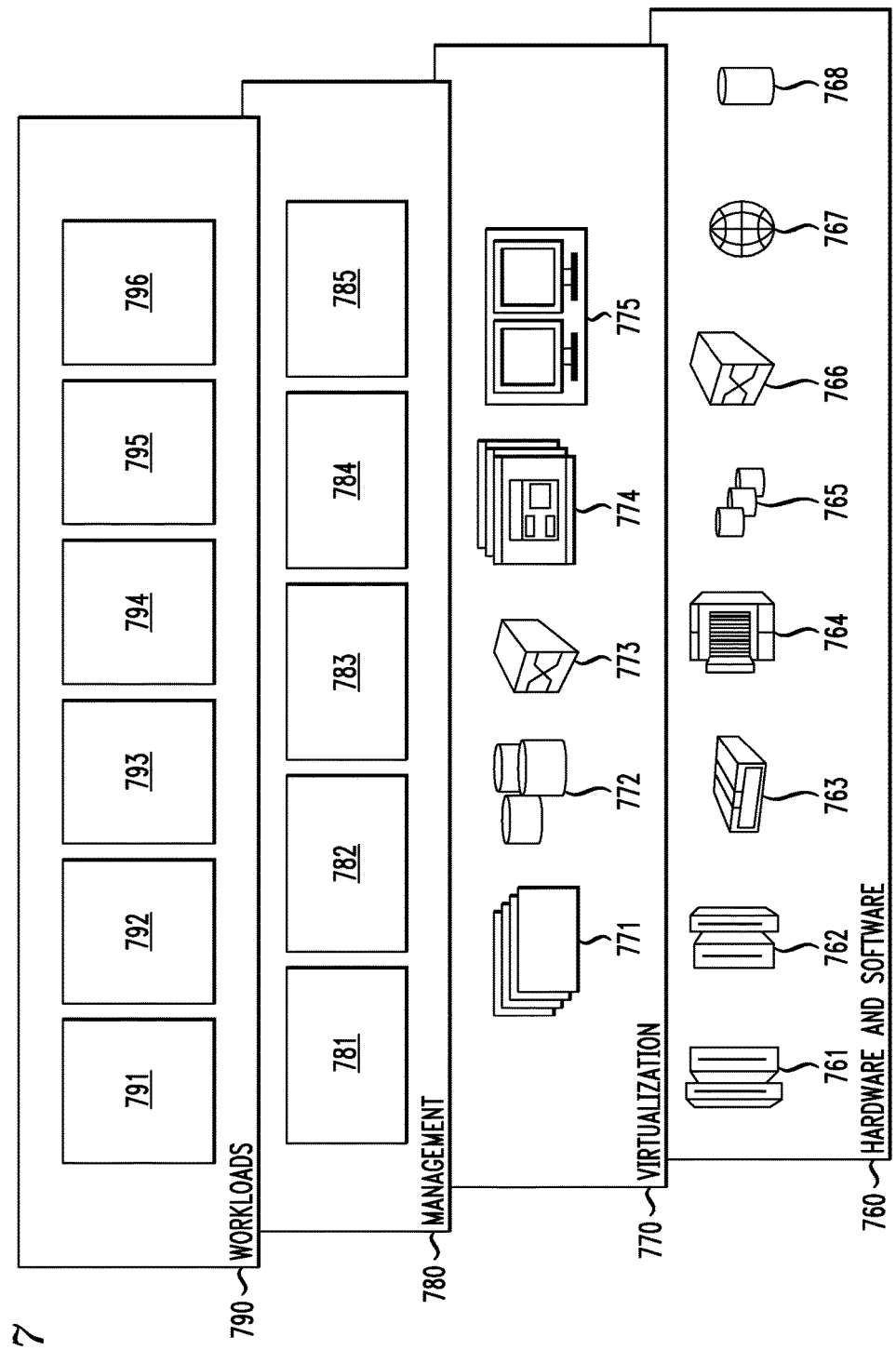
FIG. 7 depicts abstraction model layers, according to an exemplary embodiment of the invention.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and fingerprint generation and comparison, and package tampering determination 796, which may implement the functionality described above with respect to FIGS. 1-7.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for detecting package tampering, comprising:
performing first scanning of a container comprising a packaged item and a plurality of packaging elements surrounding the packaged item;
wherein the plurality of packaging elements are integrated on a base material wrapped around the packaged item;
wherein each packaging element of the plurality of packaging elements is a cushioning element comprising a sensing component comprising a stress sensor;
wherein each stress sensor measures a stress value on a corresponding packaging element in one or more directions; and
wherein each sensing component wirelessly transmits one or more of the measured stress values to one or more scanning devices;
determining at least one stress on each of the plurality of packaging elements surrounding the packaged item from the first scanning;
performing second scanning of the container comprising the packaged item and the plurality of packaging elements surrounding the packaged item;
determining at least one stress on each of the plurality of packaging elements surrounding the packaged item from the second scanning; and
comparing the at least one stress on each of the plurality of packaging elements surrounding the packaged item from the first scanning with the at least one stress on each of the plurality of packaging elements surrounding the packaged item from the second scanning;
wherein the method is performed by at least one computer system comprising at least one memory and at least one processor coupled to the memory.

2. The method according to claim 1, wherein the first scanning and the second scanning are performed when the container is closed.

3. The method according to claim 1, wherein the at least one stress on each of the plurality of packaging elements surrounding the packaged item from the first scanning and from the second scanning comprises at least one of a compressive stress and a tensile stress.

4. The method according to claim 3, wherein at least one of the compressive stress and the tensile stress are measured in more than one direction.

5. The method according to claim 1, wherein each sensing component is configured to wirelessly transmit the one or more of the measured stress values during the first scanning and during the second scanning.

6. The method according to claim 1, wherein each sensing component is configured to wirelessly transmit identification information to identify itself.

7. The method according to claim 1, further comprising generating a first output indicating the at least one stress on each of the plurality of packaging elements surrounding the packaged item from the first scanning.

8. The method according to claim 7, further comprising generating a second output indicating the at least one stress on each of the plurality of packaging elements surrounding the packaged item from the second scanning.

9. The method according to claim 8, wherein the comparing comprises comparing the first output with the second output.

10. The method according to claim 1, further comprising concluding whether the package tampering occurred based on a result of the comparing.

11. The method according to claim 1, further comprising determining a difference between the at least one stress on each of the plurality of packaging elements in the container from the first scanning and the at least one stress on each of the plurality of packaging elements in the container from the second scanning.

12. The method according to claim 11, further comprising comparing the difference to a threshold value to determine whether the package tampering occurred.

13. The method according to claim 1, wherein the first scanning is performed at a first site and the second scanning is performed at a second site.

14. A system for detecting package tampering, comprising:
a first memory and at least one first processor coupled to the first memory, wherein the at least one first processor is configured to:
scan at a first site a container comprising a packaged item and a plurality of packaging elements surrounding the packaged item;
wherein the plurality of packaging elements are integrated on a base material wrapped around the packaged item;
wherein each packaging element of the plurality of packaging elements is a cushioning element comprising a sensing component comprising a stress sensor
wherein each stress sensor measures a stress value on a corresponding packaging element in one or more directions; and
wherein each sensing component wirelessly transmits one or more of the measured stress values to one or more scanning devices; and
determine at least one stress on each of the plurality of packaging elements surrounding the packaged item from the scanning at the first site; and
a second memory and at least one second processor coupled to the second memory, wherein the at least one second processor is configured to:
scan at a second site the container comprising the packaged item and the plurality of packaging elements surrounding the packaged item;
determine at least one stress on each of the plurality of packaging elements surrounding the packaged item from the scanning at the second site; and
compare the at least one stress on each of the plurality of packaging elements surrounding the packaged item from the scanning at the first site with the at least one stress on each of the plurality of packaging elements surrounding the packaged item from the scanning at the second site.

15. The system according to claim 14, wherein the scanning at the first site and the scanning at the second site are performed when the container is closed.

16. The system according to claim 14, wherein the at least one first processor is further configured to generate a first output indicating the at least one stress on each of the plurality of packaging elements surrounding the packaged item from the scanning at the first site.

17. The system according to claim 16, wherein the at least one second processor is further configured to generate a second output indicating the at least one stress on each of the plurality of packaging elements surrounding the packaged item from the scanning at the second site.

18. The system according to claim 17, wherein in comparing the at least one second processor is further configured to compare the first output with the second output.

19. The system according to claim 14, wherein the at least one second processor is further configured to conclude whether the package tampering occurred based on a result of the comparing.

20. A computer program product for detecting package tampering, the computer program product comprising a computer readable storage medium having program instructions embodied therewith, the program instructions executable by one or more processors to cause the one or more processors to perform a method comprising:
    performing first scanning of a container comprising a packaged item and a plurality of packaging elements surrounding the packaged item;
        wherein the plurality of packaging elements are integrated on a base material wrapped around the packaged item;
        wherein each packaging element of the plurality of packaging elements is a cushioning element comprising a sensing component comprising a stress sensor;
        wherein each stress sensor measures a stress value on a corresponding packaging element in one or more directions; and
        wherein each sensing component wirelessly transmits one or more of the measured stress values to one or more scanning devices;
    determining at least one stress on each of the plurality of packaging elements surrounding the packaged item from the first scanning;
    performing second scanning of the container comprising the packaged item and the plurality of packaging elements surrounding the packaged item;
    determining at least one stress on each of the plurality of packaging elements surrounding the packaged item from the second scanning; and
    comparing the at least one stress on each of the plurality of packaging elements surrounding the packaged item from the first scanning with the at least one stress on each of the plurality of packaging elements surrounding the packaged item from the second scanning.

21. A method for detecting package tampering, comprising:
    performing scanning of a container comprising a packaged item and a plurality of packaging elements surrounding the packaged item;
        wherein the plurality of packaging elements are integrated on a base material wrapped around the packaged item;
        wherein each packaging element of the plurality of packaging elements is a cushioning element comprising a sensing component comprising a stress sensor;
        wherein each stress sensor measures a stress value on a corresponding packaging element in one or more directions; and
        wherein each sensing component wirelessly transmits one or more of the measured stress values to one or more scanning devices;
    determining at least one stress on each of the plurality of packaging elements surrounding the packaged item from the scanning; and
    generating an output indicating the at least one stress on each of the plurality of packaging elements surrounding the packaged item;
    wherein the method is performed by at least one computer system comprising at least one memory and at least one processor coupled to the memory.

22. The method according to claim 21, further comprising storing the output indicating the at least one stress on each of the plurality of packaging elements in a database.

23. The method according to claim 22, further comprising:
    performing an additional scanning of the container comprising the packaged item and the plurality of packaging elements surrounding the packaged item;
    determining at least one stress on each of the plurality of packaging elements surrounding the packaged item from the additional scanning;
    generating an additional output indicating the at least one stress on each of the plurality of packaging elements surrounding the packaged item from the additional scanning;
    retrieving the stored output from the database; and
    comparing the stored output with the additional output to determine whether there are any differences between the stored output and additional output.

24. The method according to claim 23, further comprising concluding whether the package tampering occurred based on a result of the comparing.

25. A method for detecting package tampering, comprising:
    receiving a signal from each of a plurality of packaging elements surrounding a packaged item in a container;
        wherein the plurality of packaging elements are integrated on a base material wrapped around the packaged item;
        wherein each packaging element of the plurality of packaging elements is a cushioning element comprising a sensing component comprising a stress sensor; and
        wherein each signal comprises a measured value of stress on a corresponding packaging element of the plurality of packaging elements transmitted from the sensing component of the corresponding packaging element to one or more scanning devices; and
    generating an output of the measured stress values corresponding to each of the plurality of packaging elements surrounding the packaged item;
    wherein the measured stress values correspond to one or more directions; and
    wherein the method is performed by at least one computer system comprising at least one memory and at least one processor coupled to the memory.

* * * * *